(12) United States Patent
Ueki et al.

(10) Patent No.: US 8,451,532 B2
(45) Date of Patent: May 28, 2013

(54) CONTROL APPARATUS OF OPTICAL AMPLIFIER

(75) Inventors: Taichi Ueki, Kawasaki (JP); Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 733 days.

(21) Appl. No.: 12/573,461

(22) Filed: Oct. 5, 2009

(65) Prior Publication Data

US 2010/0091357 A1 Apr. 15, 2010

(30) Foreign Application Priority Data

Oct. 14, 2008 (JP) .................................. 2008-265101

(51) Int. Cl.
*H04B 10/17* (2006.01)
*H04B 10/12* (2006.01)

(52) U.S. Cl.
USPC ................................ 359/337.12; 359/337.11

(58) Field of Classification Search
USPC .................. 359/337.11, 337.12, 337.2, 337.4
See application file for complete search history.

(56) References Cited

U.S. PATENT DOCUMENTS

| | | | | |
|---|---|---|---|---|
| 6,268,954 B1 * | 7/2001 | Cheng | ............................ | 359/337 |
| 6,359,726 B1 * | 3/2002 | Onaka et al. | ................ | 359/337.1 |
| 6,373,625 B1 * | 4/2002 | Kobayashi et al. | ....... | 359/341.41 |
| 6,611,371 B2 * | 8/2003 | Wigley et al. | ............... | 359/337.2 |
| 7,085,043 B2 | 8/2006 | Takeyama et al. | | |
| 7,139,120 B2 * | 11/2006 | Sugiya | ...................... | 359/341.42 |
| 7,359,112 B2 | 4/2008 | Nishihara et al. | | |
| 7,612,936 B2 * | 11/2009 | Usui et al. | ................. | 359/337.12 |
| 2002/0159135 A1 * | 10/2002 | Kelkar et al. | ............... | 359/337.1 |
| 2008/0239470 A1 | 10/2008 | Nishihara et al. | | |

FOREIGN PATENT DOCUMENTS

| | | |
|---|---|---|
| JP | 2000-269578 | 9/2000 |
| JP | 2006-120969 | 5/2006 |
| JP | 2006-202844 | 8/2006 |
| JP | 2006-295113 | 10/2006 |
| JP | 2008-42096 | 2/2008 |

OTHER PUBLICATIONS

Wundke et al., "A Fiber-Based, Slope Adjustable Filter for EDFA Gain Tilt Control", Proceedings of the 27$^{th}$ European Conference on Optical Communiciations (ECOC'01), p. 84-85, (2001).*
Office Action issued by the Japanese Patent Office on Oct. 30, 2012 in the corresponding Japanese patent application No. 2008-265101.

* cited by examiner

*Primary Examiner* — Eric Bolda
(74) *Attorney, Agent, or Firm* — Staas & Halsey LLP (57) ABSTRACT

A control apparatus of an optical amplifier includes a monitoring section that measures power of light inputted to the optical amplifier, a power-wavelength characteristics variable section that is operable to change a wavelength characteristic of power of the light inputted, a wavelength number decrease recognition section that compares the value of the power of light measured by the monitoring section with a predetermined threshold, and a control section that controls the power-wavelength characteristics variable section when the wavelength number decrease recognition section judges that the value of the power of light falls below the threshold.

7 Claims, 10 Drawing Sheets

CONTROL APPARATUS OF OPTICAL AMPLIFIER

CROSS-REFERENCE TO RELATED APPLICATION

This application is based upon and claims the benefit of priority of the prior Japanese Patent Application No. 2008-265101, filed on Oct. 14, 2008, the entire contents of which are incorporated herein by reference.

FIELD

The embodiments discussed herein are related to a control technique of an optical amplifier used for an optical transmission system.

BACKGROUND

Figures 8A, 8B:
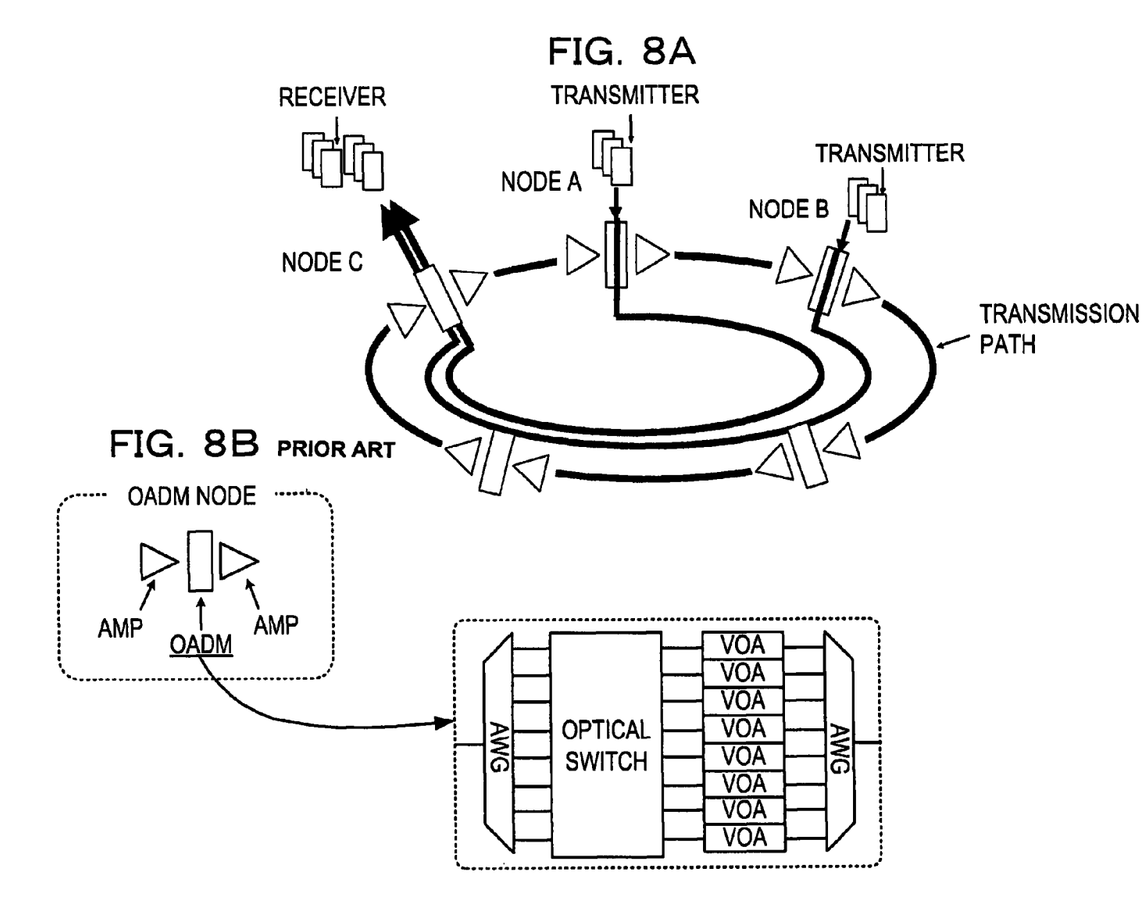
FIGS. 8A and 8B are schematic configuration diagrams of a WDM optical transmission system.

In recent years, in WDM (Wavelength Division Multiplex) optical transmission systems, metro core systems capable of interconnecting local hub cities and inserting (adding) or branching (dropping) an optical signal of an arbitrary wavelength at arbitrary nodes are becoming a focus of attention. FIG. 8 illustrates an overview of such a system.

The WDM optical transmission system shown in FIG. 8 is configured by connecting a plurality of OADM (Optical Add-Drop Multiplexer) nodes in a ring shape via a transmission path (optical fiber). The OADM at each OADM node is designed to allow light (channel) of an arbitrary wavelength to be inserted into the transmission path (node A and node B in FIG. 8) and allow light of an arbitrary wavelength out of transmitted WDM signal light to be branched (node C) from the transmission path. The OADM, configured as illustrated in FIG. 8, is an apparatus that demultiplexes WDM signal light into channels through an optical multiplexer/demultiplexer using an AWG (Arrayed Waveguide Grating) or the like and inserts or branches the optical signal channel by channel using an optical switch. The OADM can provide a variable optical attenuator (VOA) as optical power adjusting section for each channel of the WDM signal light. The variable optical attenuator provided channel by channel is designed to be able to compensate for a power variation for each wavelength (channel by channel) and perform automatic level control (ALC).

Each OADM node is provided with an optical amplifier (AMP) for received light and an optical amplifier for transmission light before and after the OADM respectively. The front-end optical amplifier compensates for signal light loss produced in the transmission path between the own node and an upstream node. On the other hand, the back-end optical amplifier compensates for signal light loss produced in the OADM or the like within the own node. These optical amplifiers are intended to extend a transmission distance. These optical amplifiers using an EDFA (Erbium Doped Fiber Amplifier) or the like perform automatic gain control (AGC).

Figure 9:
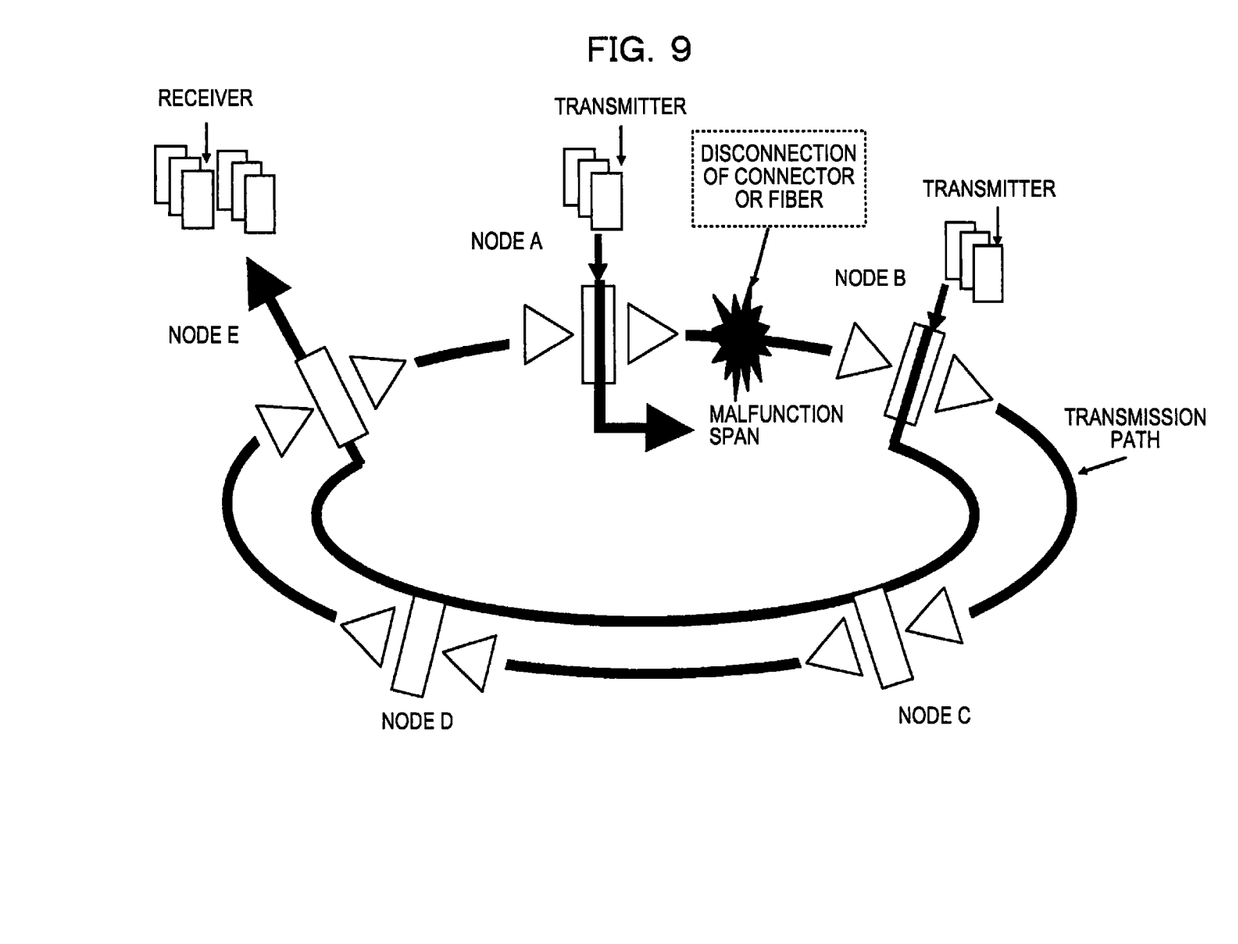
FIG. 9 is a schematic configuration diagram of a WDM optical transmission system illustrating when a malfunction has occurred.

In such a WDM optical transmission system, malfunctions during system operations, such as a disconnection of a connector provided in the transmission path and disconnection of a fiber or the like, need to be taken into consideration. An example of this malfunction is illustrated in FIG. 9. In the illustrated example, a communication malfunction has occurred between node A and node B, preventing an optical signal inserted at node A from being received at node B. As a result, there is no more optical signal corresponding to the wavelength inserted at node A from the malfunction span (between node A and node B) onward, which causes the number of wavelengths of the WDM signal light, to change over a short span of time.

For example, suppose the malfunction causes the number of wavelengths of the WDM signal light to drastically reduce from 10 to 1. There is a period during which the response of ALC cannot catch up with the drastic change in the number of wavelengths and ALC corresponding to WDM signal light for 10 waves before the malfunction continues in this transient period although the remaining one wave of WDM signal light is actually transmitted. That is, during the transient period, transient ALC that controls the power of the remaining one wave to power corresponding to 10 waves is performed.

In this case, a variation occurs in the signal light power according to the remaining wavelength. One main cause is stimulated Raman scattering that occurs in a transmission path, dispersion compensating module (DCM) or the like.

Stimulated Raman scattering (SRS) is a phenomenon that occurs in an optical fiber or dispersion compensating fiber (DCF) used in the transmission path. The SRS is a phenomenon that when WDM signal light propagates in the transmission path, part of the light power on the short wavelength side contributes as excitation light and the light power on the long wavelength side is thereby amplified (a Raman amplifier uses this phenomenon). In a situation in which SRS has occurred, when light on the short wavelength side disappears due to the occurrence of a malfunction and the light on the long wavelength side under the influence of the SRS by the light on the short wavelength side remains, the influence of the SRS disappears, and as a result, the power of the residual light falls below the average power before the occurrence of the malfunction. On the contrary, when the light on the long wavelength side disappears due to the occurrence of the malfunction and the light on the short wavelength side remains, the portion that can be allocated to excitation light disappears, and as a result, the power of the residual light exceeds the average power before the occurrence of the malfunction. That is, the effect of the SRS changes according to the number of signal wavelengths and the location of WDM signal light propagating through the transmission path and a variation occurs in the power of WDM signal light before and after the occurrence of the malfunction.

When the number of wavelengths (number of channels) of the WDM signal light drastically changes, the output wavelength characteristics of the optical amplifier changes caused by the SRS and the output light power of the residual light (remaining channel) changes. Even if the amount of variation at one node is not large, if the above described transient ALC is executed at each node through which the signal light passes and there are many optical amplifiers that execute AGC, power variations are accumulated as the number of nodes through which the signal light passes, that is, the number of relays increases.

Figure 10:
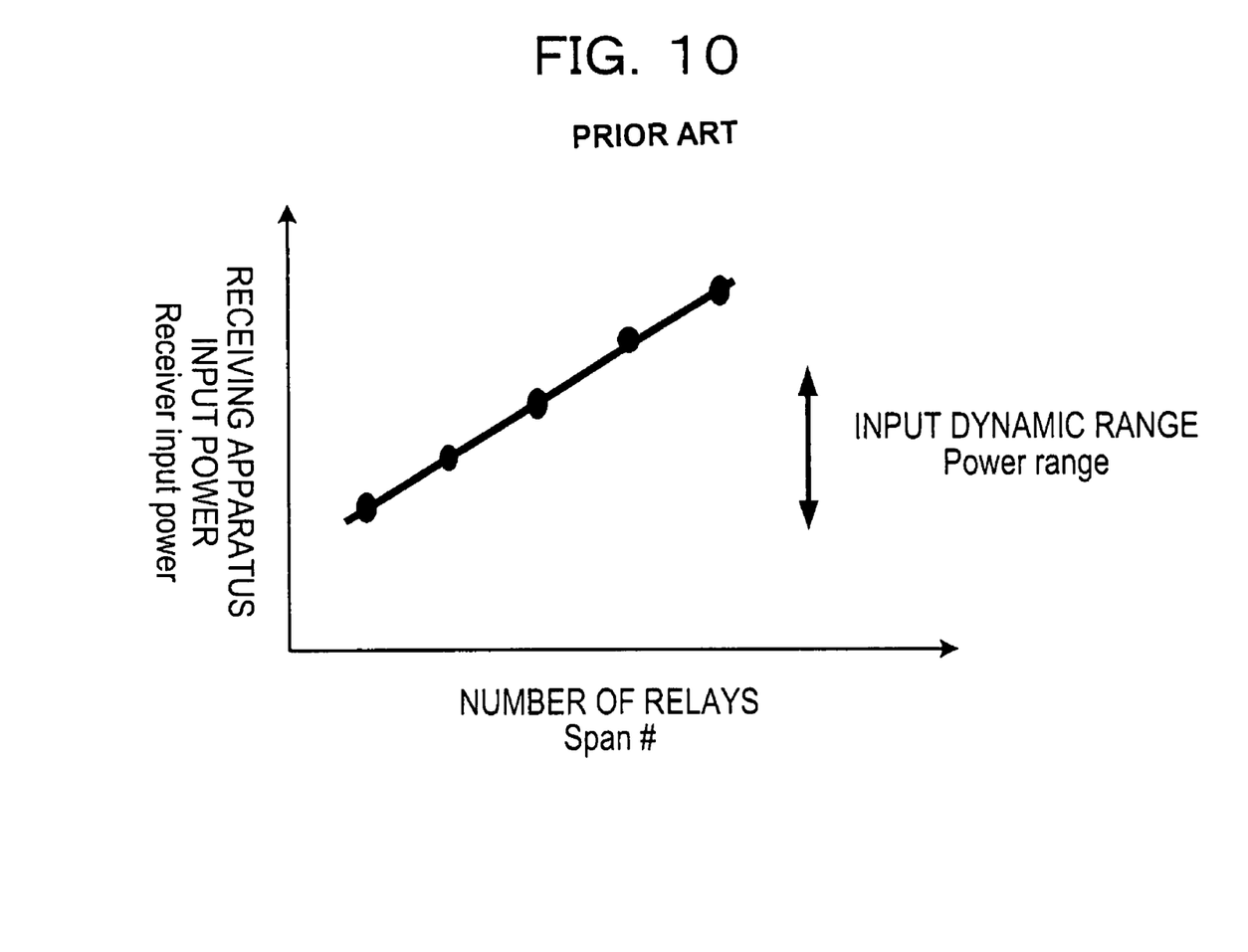
FIG. 10 is a graph illustrating an input power variation of a receiving apparatus when a malfunction has occurred.

In an example shown in FIG. 10, when this accumulation of power variations exceeds an allowable range of reception (input dynamic range) of the light receiving apparatus, good reception characteristics can no longer be obtained and the number of errors in the residual light may increase.

Table 1 below illustrates a relationship between a variation in the signal light power and wavelength condition when the number of wavelengths decreases. The following cases can be assumed as patterns of decrease in the number of wavelengths.

1. When the wavelength (signal wavelength) of the residual light corresponds to the short wavelength side. 2. When the wavelength corresponds to the central waveband. 3. When the wavelength corresponds to the long wavelength side. 4. When the wavelength is divided into the short wavelength side and long wavelength side.

TABLE 1

| | Signal wavelength (residual light) | | | |
|---|---|---|---|---|
| Wavelength condition | In normal operation | After change of number of wavelengths | Signal light power variation | Cause SRS |
| 1 | All wavelengths | One wavelength (short wavelength side) | Plus | ○ |
| 2 | All wavelengths | One wavelength (central waveband) | Small | Δ |
| 3 | All wavelengths | One wavelength (long wavelength side) | Large minus | ○ |
| 4 | All wavelengths | Several wavelength (both wavelength sides) | Small | Δ |

In the case of the wavelength condition 1 where the wavelength of the residual light corresponds to the short wavelength side, when, for example, all wavelengths of transmittable signal band are being transmitted, if one wavelength on the short wavelength side remains, the residual light is susceptible to a power variation under the influence of SRS and the power variation direction observed in the output light of the optical amplifier relatively increases on the plus side. In the light receiving apparatus under the control of the node provided in the transmission path downstream of the location of a malfunction that causes a decrease in the number of wavelengths, power variations are accumulated as the number of relays increases, and therefore the power of the signal light inputted to the light receiving apparatus may exceed an allowable range of reception, thus affecting the signal quality.

On the contrary, in the case of the wavelength condition 3 where the wavelength of the residual light corresponds to the long wavelength side, when, for example, all wavelengths of the transmittable signal band are being transmitted, if one wavelength on the long wavelength side remains, the residual light is susceptible to a power variation under the influence of SRS and the power variation direction observed in the output light of the optical amplifier relatively increases on the minus side. In the light receiving apparatus under the control of the node provided in the transmission path downstream of the location of a malfunction causing a decrease in the number of wavelengths, power variations are accumulated as the number of relays increases, and therefore the power of the signal light inputted to the light receiving apparatus may fall below the allowable range of reception, thus affecting the signal quality.

Furthermore, in the case of the wavelength condition 2 where the wavelength of the residual light corresponds to the central waveband and in the case of the wavelength condition 4 where the wavelength of the residual light is distributed divided into the short wavelength side and the long wavelength side, the power variations are smaller than those in the above described cases.

Regarding a power variation caused by insertion or branching of an optical signal performed according to a normal operating procedure in normal operation where no malfunction has occurred, since the duration of variation in the number of wavelengths (variation speed) is scheduled, ALC that compensates for a power variation for each wavelength is possible using a variable optical attenuator provided for the OADM channel by channel as light power adjusting section as described above. However, in cases caused by a malfunction such as a fiber disconnection, the speed of variation in the number of wavelengths is unscheduled and the variation duration is short, and therefore a power variation occurs at higher speed than the response speed (response time) of the variable optical attenuator and the response speed of output control of the optical amplifier and an error may occur in the light receiving apparatus. Therefore, the problem in avoiding errors in the light receiving apparatus is how to compensate for a high-speed power variation. Therefore, there is proposed means for compensating for a light power variation as disclosed in Japanese Patent Laid-Open No. 2006-295113.

The method disclosed in the above described document divides and monitors a signal band and compensates for a power variation in each of the divided bands and is a technique that adjusts a variable optical attenuator by calculating respective power variations of the divided bands. However, such a method for compensating light power variations leads to an increase in complexity of all of the optical circuit, control circuit and calculations, and still has room for improvement in terms of the speed of compensation for power variations and cost.

SUMMARY

A control apparatus of an optical amplifier includes a monitoring section that measures power of light inputted to the optical amplifier, a power-wavelength characteristics variable section that is operable to change a wavelength characteristic of power of the light inputted, a wavelength number decrease recognition section that compares the value of the power of light measured by the monitoring section with a predetermined threshold, and a control section that controls the power-wavelength characteristics variable section when the wavelength number decrease recognition section judges that the value of the power of light falls below the threshold.

The object and advantages of the invention will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENT(S)

First, in the relationship between a variation in signal light power and a wavelength condition when the number of wavelengths decreases, as illustrated in aforementioned Table 1, attention is particularly focused on the wavelength condition 1 and the wavelength condition 3 where the power variation increases. In response to the variation in the output wavelength characteristics that occurs in the optical amplifier in the cases of the wavelength conditions 1 and 3, a compensation power-wavelength characteristics that cancels out this variation corresponds to a direction as shown in next Table 2. FIG. 1 illustrates an overview of such a compensation power-wavelength characteristics.

TABLE 2

| Wavelength condition | In normal operation | Signal wavelength (residual light) After number of wavelengths changes | Signal light power variation | Cause SRS | Compensation power-wavelength characteristics |
|---|---|---|---|---|---|
| 1 | All wavelengths | One wavelength (short wavelength side) | Plus | ○ | Minus direction |
| 2 | All wavelengths | One wavelength (central waveband) | Small | Δ | Small influence |
| 3 | All wavelengths | One wavelength (long wavelength side) | Large minus | ○ | Plus direction |
| 4 | All wavelengths | Several waves (both wavelength sides) | Small | Δ | Short wavelength: minus direction Long wavelength: plus direction |

Figure 1A:
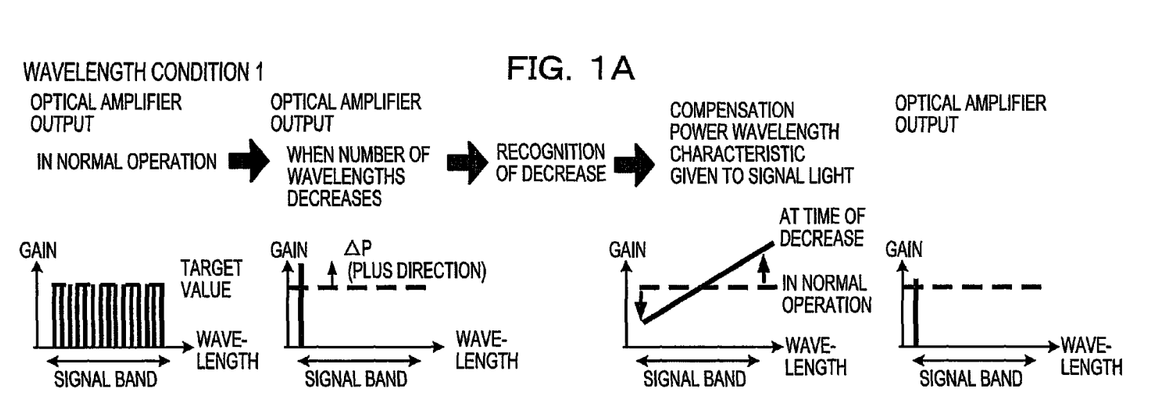
FIGS. 1A and 1B are graphs illustrating compensation power-wavelength characteristics for residual light, with the horizontal axis showing a wavelength and the vertical axis showing a gain.

FIG. 1A illustrates a compensation power-wavelength characteristics given to residual light (WDM signal light) to compensate for an output wavelength characteristic variation in the optical amplifier in the case of the wavelength condition 1. In the wavelength condition 1, since a wavelength on the short wavelength side remains due to a decrease in the number of wavelengths, output light power of the optical amplifier temporarily increases by ΔP for the aforementioned reason. Therefore, if a wavelength characteristic that reduces power on the short wavelength side is given to the residual light to be inputted to the optical amplifier before input in this case, the increase by ΔP is canceled out and it is possible to control the output light power of the optical amplifier so as not to considerably deviate from a target value.

Figure 1B:
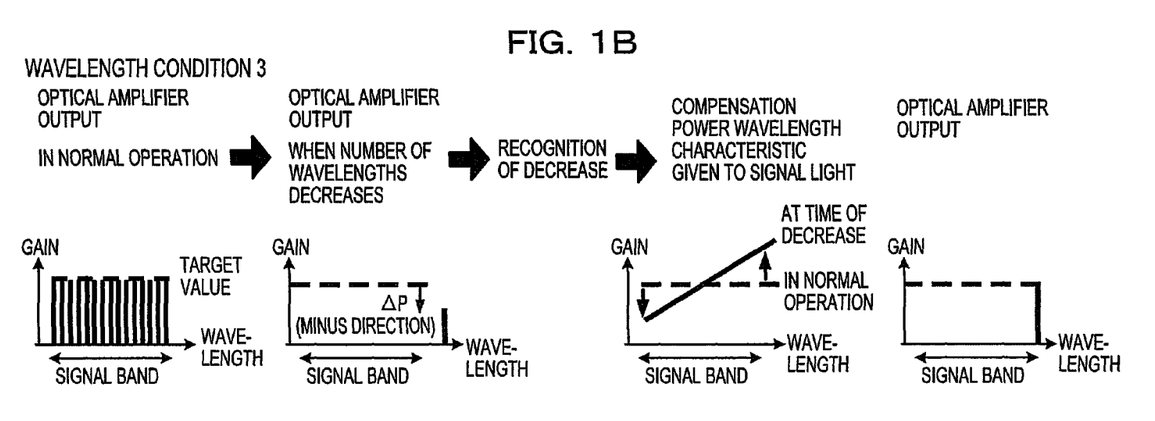

FIG. 1B illustrates a compensation power-wavelength characteristics given to residual light (WDM signal light) to compensate for an output wavelength characteristic variation in the optical amplifier in the case of the wavelength condition 3. In the wavelength condition 3, since a wavelength on the long wavelength side remains due to a decrease in the number of wavelengths, output light power of the optical amplifier temporarily decreases by ΔP for the aforementioned reason. Therefore, if a wavelength characteristic that increases power on the long wavelength side is given to the residual light to be inputted to the optical amplifier before input in this case, the decrease by ΔP is canceled out and it is possible to control the output light power of the optical amplifier so as not to considerably deviate from a target value.

Considering both cases, when a decrease in the number of wavelengths of WDM signal light occurs, decreasing the power on the short wavelength side and increasing the power on the long wavelength side of the residual light, for example, giving a rightward rising compensation power-wavelength characteristics, as shown in the third graph from the left in FIG. 1A, can cancel out variations in the output wavelength characteristic of the optical amplifier produced by a decrease in the number of wavelengths and reduce the power variation to a minimum. "Rightward rising" refers, in other words, to a characteristic of positive linear inclination assuming the central wavelength of a signal band of the WDM signal light is the center of gravity.

Figure 2:
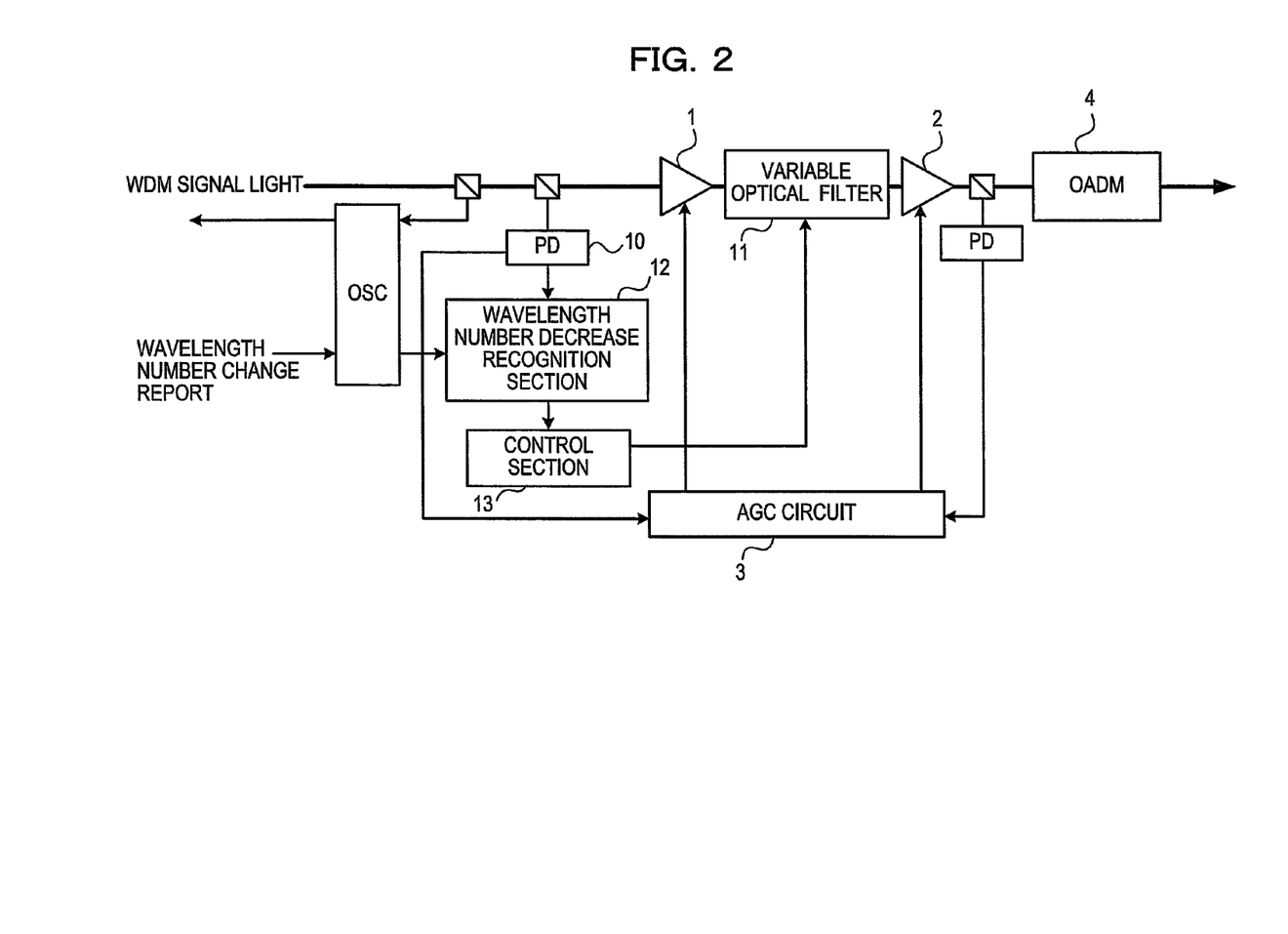
FIG. 2 is a block diagram illustrating a control apparatus of an optical amplifier according to a first embodiment.

FIG. 2 is a configuration example of a control apparatus according to a first embodiment to give the above described compensation power-wavelength characteristics to residual light inputted to the optical amplifier.

The optical amplifier in FIG. 2 is provided for received light at the OADM node shown in FIG. 8, and EDFA's 1 and 2 are lined up in series as optical amplifiers and controlled by an AGC circuit 3. The OADM 4 shown in FIG. 8 is provided after the optical amplifier and ALC is executed by a variable optical attenuator, which is light power adjusting section for each channel. In this optical amplifier, the control apparatus provided to give a compensation power-wavelength characteristics to WDM signal light is configured using a monitoring section 10, a power-wavelength characteristics variable section 11, a wavelength number decrease recognition section 12 and a control section 13.

The monitoring section 10 is provided to measure total power of WDM signal light and a photodiode (PD) is used to divide and receive the WDM signal light inputted to the front-end EDFA 1 of the serially connected EDFA's using an optical divider and measure the signal light power thereof. In the case of the present embodiment, the output of this monitoring section 10 is also used for the AGC circuit 3 as well as the wavelength number decrease recognition section 12.

The power-wavelength characteristics variable section 11 is a compensation device that changes a power-wavelength characteristics of the WDM signal light so as to give the compensation power-wavelength characteristics explained in FIG. 1 and provided before the back-end EDFA 2 of the serially connected EDFA's, that is, between the two EDFA's 1 and 2 connected in series. A variable optical filter is used as the power-wavelength characteristics variable section 11 of the first embodiment and the light transmission characteristic thereof is controlled so as to have a characteristic that cancels out a variation in the output wavelength characteristic of the EDFA 2. A product known as a variable spectrum equalizer using a variable Faraday rotator or the like can be used for the variable optical filter capable of such characteristic control.

The wavelength number decrease recognition section 12 judges a decrease in the number of wavelengths of the WDM signal light by comparing the value of total power of the WDM signal light measured by the monitoring section 10 with a predetermined threshold. That is, when the value of total power of the WDM signal light changes to an extent that it exceeds the threshold, the wavelength number decrease recognition section 12 recognizes that a decrease in the number of wavelengths has occurred due to a malfunction. For example, suppose a difference of 3 dB is provided between the value of total power of the WDM signal light in normal operation and a threshold. Explaining this in an example with specific numerical values, when the value of total power of the WDM signal light in normal operation is −20 dBm, it is when the measured value of the monitoring section 10 has changed to −23 dBm that the occurrence of a decrease in the number of wavelengths in normal operation is recognized.

Thus, when the wavelength number decrease recognition section 12 recognizes a decrease in the number of wavelengths from the comparison between the measured value of total power and the threshold, the control section 13 controls the power-wavelength characteristics variable section 11 so as to at least cancel out a variation of the output wavelength characteristic of the EDFA 2 caused by a decrease in the number of wavelengths. That is, the control section 13 controls the light transmission characteristic of the variable optical filter so that the WDM signal light has the above described compensation power-wavelength characteristic.

Figure 3:
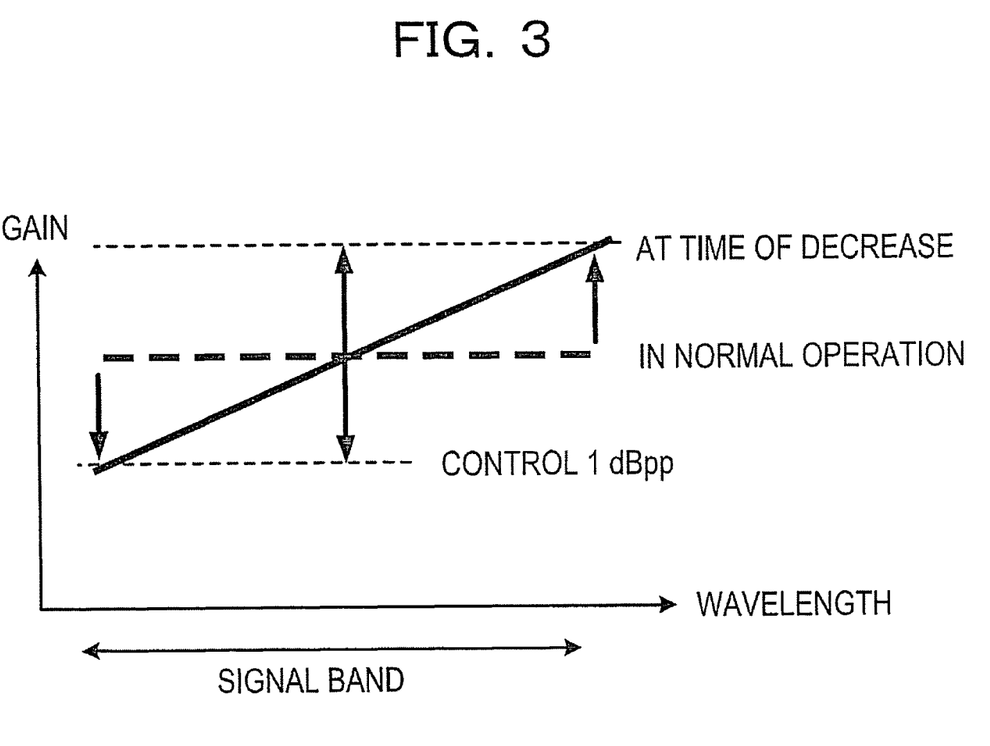
FIG. 3 is a graph illustrating compensation power-wavelength characteristics according to the first embodiment, with the horizontal axis showing a wavelength and the vertical axis showing a gain.

The compensation power-wavelength characteristics is a wavelength characteristic that decreases the power on the short wavelength side and increases the power on the long wavelength side, as explained in FIG. 1, and is a characteristic of positive linear inclination assuming the central wavelength of the WDM signal light is the center of gravity. The amount of inclination is set to have an inclination such that there is a difference of 1 dBpp between a minimum value and a maximum value of the WDM signal light in the C band whose signal band ranges from 1530 to 1565 nm as shown in an example in FIG. 3. However, the amount of inclination is not limited to the example described here.

Figure 4:
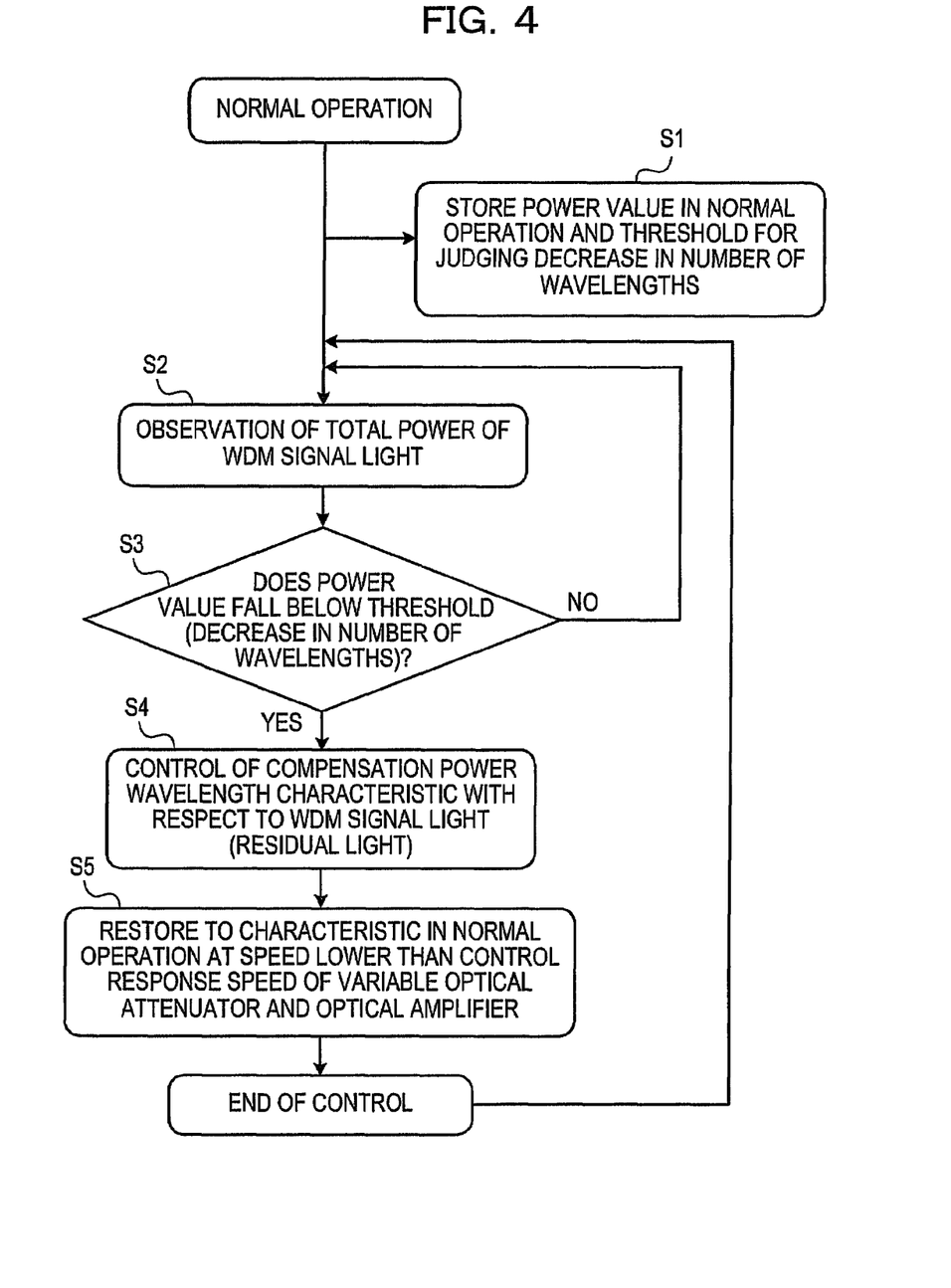
FIG. 4 is a flowchart illustrating a control flow when a decrease in the number of wavelengths due to a malfunction occurs.

FIG. 4 is an example of a control flow executed by such a control apparatus according to the first embodiment.

First, the wavelength number decrease recognition section 12 in FIG. 2 in the optical amplifier included at each node of the WDM optical transmission system shown in FIG. 8 stores the value of total power measured by the monitoring section 10 for the WDM signal light in normal operation in storing means, such as a semiconductor memory. Furthermore, the wavelength number decrease recognition section 12 stores a threshold of wavelength number decrease recognition set by a system administrator (step S1). For example, when the value of total power in normal operation is −20 dBm as described above, the threshold is set to −23 dBm so that a decrease in the number of wavelengths can be recognized when a variation exceeding 3 dB is detected. The value of total power in normal operation varies depending on the number of wavelengths included in the WDM signal light in normal operation transmitted in the WDM optical transmission system and is updated when the number of wavelengths in normal operation changes. The threshold can be reset in accordance therewith as appropriate.

Using the threshold as a reference, the wavelength number decrease recognition section 12 that has stored the value of total power in normal operation monitors the value of total power by the monitoring section 10 that measures the total power of the WDM signal light inputted to the EDFA's 1 and 2 (step S2). The wavelength number decrease recognition section 12 then compares the measured value of total power with the threshold stored in step S1 (step S3), and continues the measurement of the WDM signal light unless there is a variation to an extent that it reaches the threshold. On the other hand, when the measured value of total power drastically changes to an extent that it falls below the threshold, the wavelength number decrease recognition section 12 recognizes this change as a decrease in the number of wavelengths due to the occurrence of a malfunction and reports this to the control section 13.

When the wavelength number decrease recognition section 12 recognizes the decrease in the number of wavelengths, the control section 13 controls the power-wavelength characteristics variable section 11 so as to provide the WDM signal light (residual light) that passes through the power-wavelength characteristics variable section 11 with a compensation power-wavelength characteristics (step S4). Since the first embodiment uses a variable optical filter, the WDM signal light inputted to the EDFA 2 is controlled so as to have the compensation power-wavelength characteristics shown in FIG. 3 by controlling the light transmission characteristic thereof. As a result of this compensation power-wavelength characteristic, it is possible to cancel out a variation in the output wavelength characteristic of the EDFA caused by a decrease in the number of wavelengths and keep the power variation to a minimum.

After this, light power is adjusted for the WDM signal light outputted from the EDFA 2 through the variable optical attenuator provided for each channel of the OADM 4 and the power of the WDM signal light is thereby adjusted for each wavelength. As described above, the accumulation of power variations can be eliminated if ALC by the variable optical attenuator can be normally performed, and therefore there will be no problem even when the power-wavelength characteristics variable section 11 is restored to its original condition. Therefore, the control section 13 of the present embodiment restores the state of the power-wavelength characteristics variable section 11 to the state in normal operation that is the state before the control in step S4 at a speed lower than the response speed of the variable optical attenuator and the output control response speed of the EDFA (step S5). This example assumes that the restoring speed lower than at least the response speed of the variable optical attenuator is set, but the restoring speed is not limited to this and if there is another apparatus having a lower response speed than that of the variable optical attenuator, the restoring speed can be made to match that response speed. That is, the restoring speed can be made to be lower than that of the apparatus whose response speed is the lowest among apparatuses that perform ALC and AGC.

In addition to such a setting of restoring speed, it is also possible to perform control so as to restore the power-wavelength characteristics variable section 11 to a state in normal operation based on the information reported to each node via an OSC (Optical Supervisory Channel). That is, the control section 13 performs control such that the power-wavelength characteristics variable section 11 provides the WDM signal light with a compensation of the power-wavelength characteristics until malfunction restoration information is reported via the OSC. By receiving the malfunction restoration information via the OSC, the control section 13 restores the power-wavelength characteristics variable section 11 to the state in normal operation when a recovery from the decrease in the number of wavelengths is confirmed.

Figure 5:
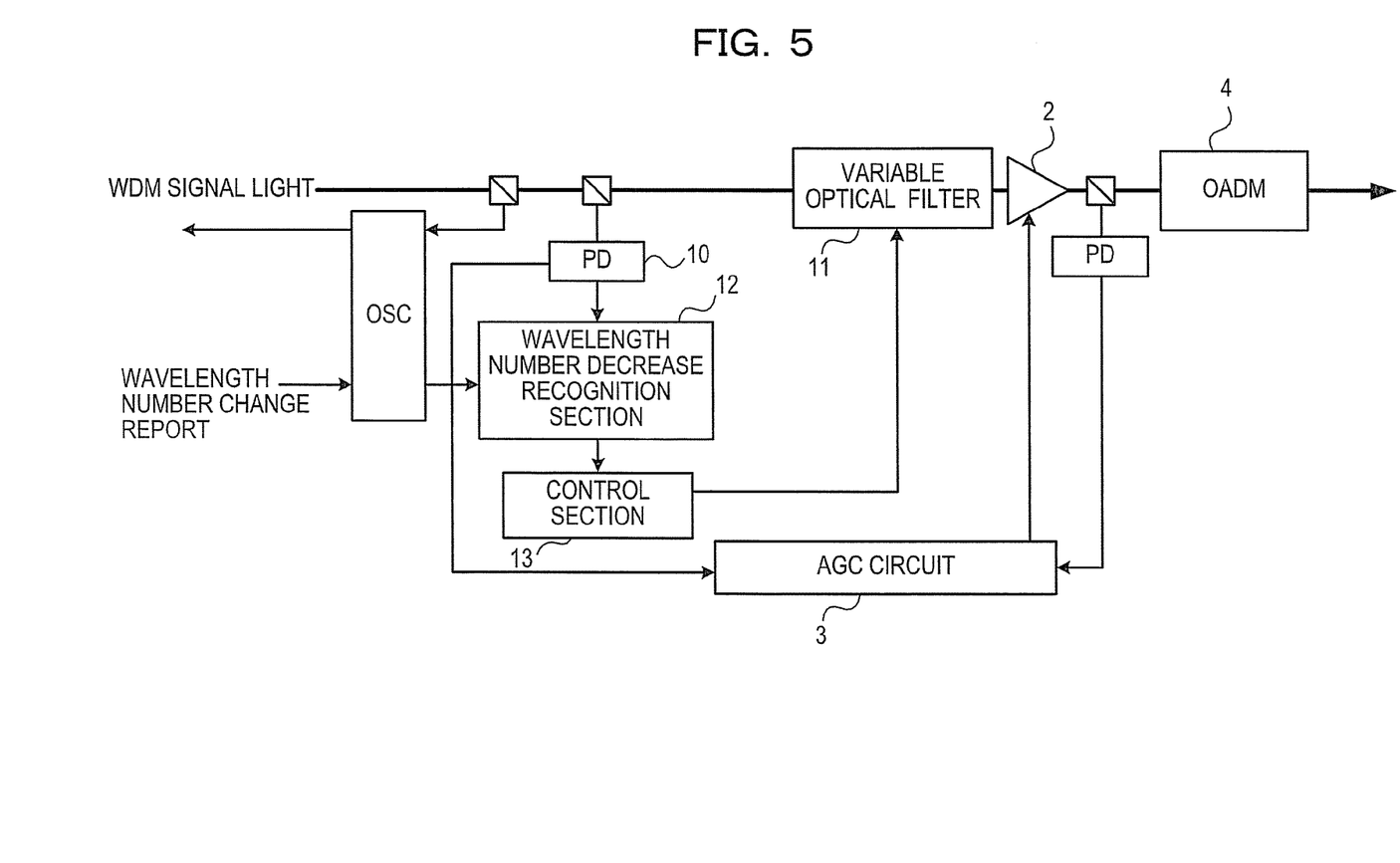
FIG. 5 is a block diagram illustrating a control apparatus of an optical amplifier according to a second embodiment.

FIG. 5 illustrates a second embodiment. A monitoring section 10, a power-wavelength characteristics variable section 11 using a variable optical filter, a wavelength number decrease recognition section 12 and a control section 13 of a control apparatus according to the second embodiment are similar to those of the first embodiment shown in FIG. 2. The second embodiment is different in that EDFA's are not lined up in series and a one-EDFA configuration with only the back-end EDFA 2 according to the first embodiment is adopted and the power-wavelength characteristics variable section 11 is provided before the one EDFA 2. Effects similar to those described above can be obtained in this case, too. Common parts in both figures are assigned the same reference numerals.

Figure 6:
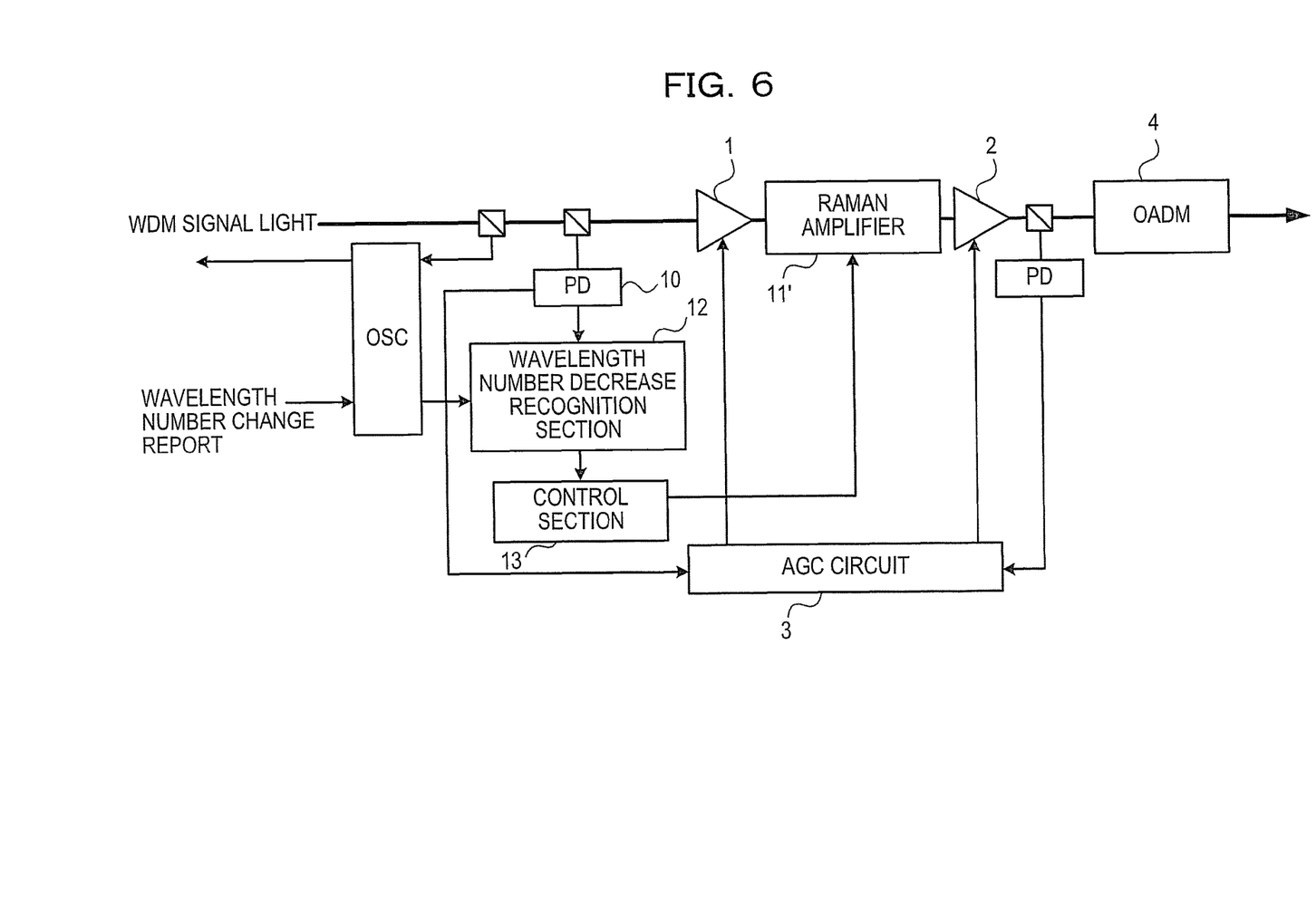
FIG. 6 is a block diagram illustrating a control apparatus of an optical amplifier according to a third embodiment.
Figure 7:
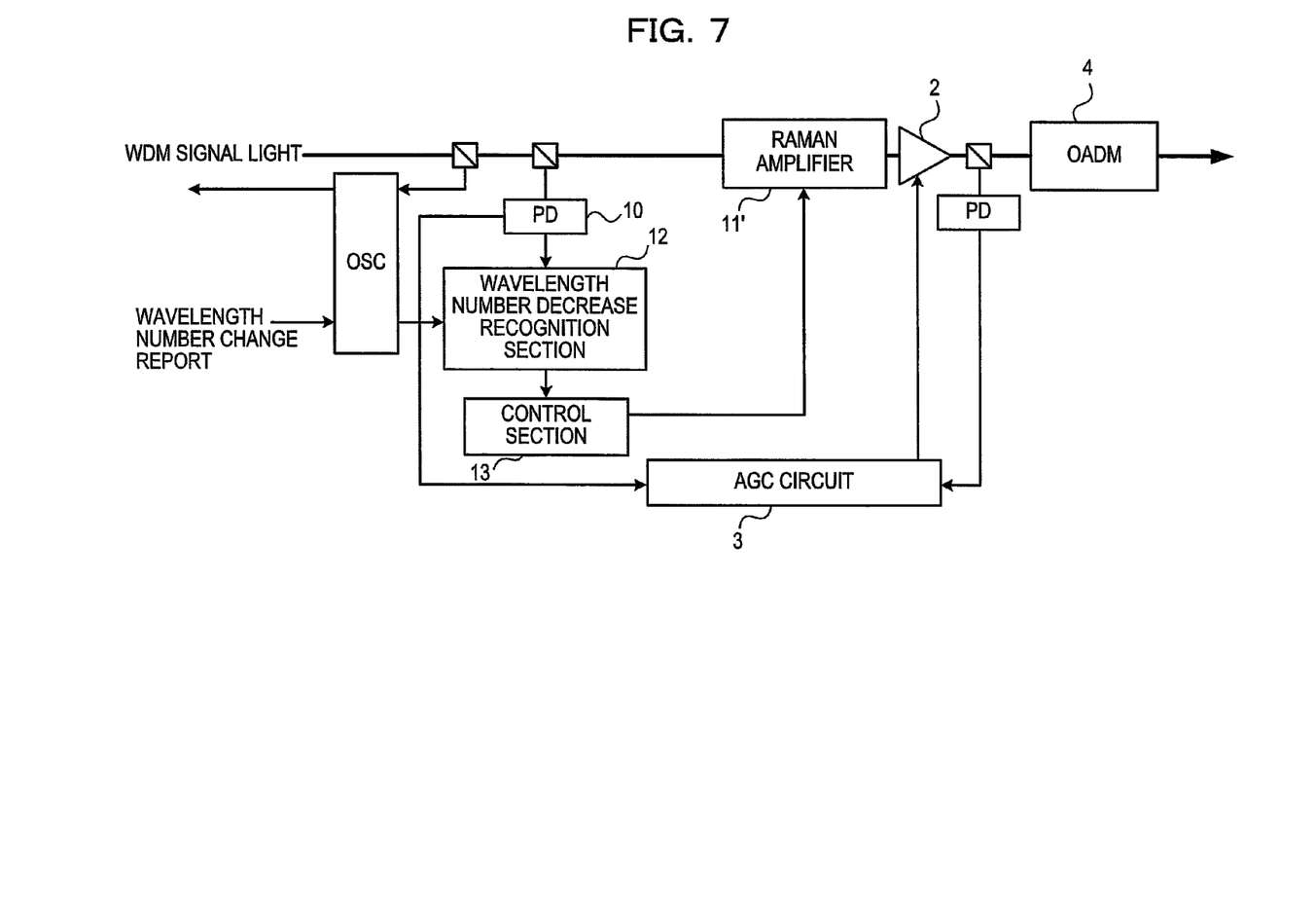
FIG. 7 is a block diagram illustrating a control apparatus of an optical amplifier according to a fourth embodiment.

Furthermore, FIG. 6 and FIG. 7 illustrate third and fourth embodiments. In these embodiments, the power-wavelength characteristics variable section 11 using a variable optical filter in the first and second embodiments are replaced by a power-wavelength characteristics variable section 11' using a Raman amplifier. The third embodiment shown in FIG. 6 is an example where the power-wavelength characteristics variable section 11' is disposed between EDFA's 1 and 2 connected in series in the same way as in the first embodiment. The fourth embodiment shown in FIG. 7 is an example where the power-wavelength characteristics variable section 11' is disposed before one EDFA 2 in the same way as in the second embodiment. Common parts in both figures are assigned the same reference numerals.

The control section 13 according to the third and fourth embodiments controls the power-wavelength characteristics variable section 11' using a Raman amplifier so that the proportion of the long wavelength side excitation light power is greater than that of the short wavelength side excitation light power. Such control allows effects similar to those of the first and second embodiments to be obtained and the Raman gain allows the input level to the EDFA 2 to increase, leading to improvement of an SN ratio in addition to compensation for a power variation.

This example has disclosed a Raman amplifier, but any optical amplifying means is usable if a similar compensation of the power-wavelength characteristics can be obtained. However, the Raman amplifier is originally an amplifier that applies the phenomenon that light power on the short wavelength side amplifies light power on the long wavelength side, and therefore the Raman amplifier is suitable for obtaining a compensation output wavelength characteristic displaying the "rightward rising" linear inclination shown in the above example.

In the control apparatus according to the above described embodiments, the monitoring section measures total power of WDM signal light, the wavelength number decrease recognition section compares the measured value of total power with a threshold and thereby judges a decrease in the number of wavelengths. Since the total power is measured, a simple configuration using a photodiode or the like can be adopted for the monitoring section and the circuit configuration of the wavelength number decrease recognition section that compares this measured value can also be simplified.

Furthermore, since the power-wavelength characteristics variable section that changes the power-wavelength characteristics of the WDM signal light does not perform meticulous adjustments for each wavelength, the power-wavelength characteristics variable section can be configured using devices such as a variable optical filter and amplifier. That is, since band division is unnecessary, the control apparatus of the present embodiment can reduce the number of components including the control section and the power-wavelength characteristics variable section and an effect like a cost reduction can be expected. Furthermore, control can also be simplified and an effect of speed enhancement of response to a power variation can also be expected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:

1. A control apparatus of an optical amplifier, comprising:
a monitoring section that measures a power of light inputted to the optical amplifier;
a power-wavelength characteristics variable section that is operable to change a wavelength characteristic of power of the light inputted;
a wavelength number decrease recognition section that compares a value of the power of light measured by the monitoring section with a predetermined threshold; and
a control section that controls the power-wavelength characteristics variable section when the wavelength number decrease recognition section judges that the value of the power of light falls below the threshold,
wherein the control section controls the power-wavelength characteristics variable section so as to have a characteristic that power on a short wavelength side of wavelength division multiplex signal light decreases and power on a long wavelength side of wavelength division multiplex signal light increases.

2. The control apparatus according to claim 1, wherein the control section controls the power-wavelength characteristics variable section so as to have a characteristic of linear inclination assuming the central wavelength of the wavelength division multiplex signal light is the center of gravity.

3. The control apparatus according to claim 1, wherein the power-wavelength characteristics variable section is a variable optical filter.

4. The control apparatus according to claim 1, wherein the power-wavelength characteristics variable section is a Raman amplifier.

5. The control apparatus according to claim 1, further comprising a light power adjusting section to adjust power channel by channel of wavelength division multiplex signal light outputted from the optical amplifier disposed after the optical amplifier,
wherein the control section restores the power-wavelength characteristics variable section to a state before the control at a speed lower than a response speed of the light power adjusting section after controlling the power-wavelength characteristics variable section.

6. The control apparatus according to claim 5, wherein the light power adjusting section is a variable optical attenuator.

7. The control apparatus according to claim 1, wherein when the control section controls the power-wavelength characteristics variable section and the wavelength number decrease recognition section then judges that the measured value of the power of light has exceeded a threshold, the control section restores the power-wavelength characteristics variable section to a state before the control.

* * * * *